United States Patent [19]

Baker et al.

[11] Patent Number: 5,013,207
[45] Date of Patent: May 7, 1991

[54] CROP TRANSPORTER

[75] Inventors: Malcolm J. Baker; James R. Warren, both of Bundaberg, Australia

[73] Assignee: Austoft Industries Limited, Bundaberg, Australia

[21] Appl. No.: 535,306

[22] Filed: Jun. 7, 1990

Related U.S. Application Data

[63] Continuation of Ser. No. 431,711, Nov. 2, 1989, abandoned, which is a continuation of Ser. No. 209,535, Jun. 21, 1988, abandoned.

[30] Foreign Application Priority Data

Jun. 22, 1987 [AU] Australia ................................ PI2594

[51] Int. Cl.$^5$ ............................................. B60P 1/38
[52] U.S. Cl. ................................... 414/489; 414/505; 414/523; 414/528
[58] Field of Search ............... 414/486, 489, 491, 502, 414/503, 505, 523, 528, 501; 298/11, 17 B

[56] References Cited

U.S. PATENT DOCUMENTS

| | | | |
|---|---|---|---|
| 2,636,628 | 4/1953 | Prang | 414/489 |
| 3,123,017 | 3/1964 | Konig et al. | 414/489 X |
| 3,214,049 | 10/1965 | Grove | 414/502 |
| 3,214,050 | 10/1965 | McConeghy, Jr. | 414/502 |
| 3,214,051 | 10/1965 | McConeghy, Jr. et al. | 414/505 |
| 3,345,042 | 10/1967 | Ryan | 414/502 X |
| 3,348,714 | 10/1967 | Ash | 414/489 |
| 3,482,721 | 12/1969 | Gleichman | 414/491 |
| 3,672,724 | 6/1972 | Neuzil, Sr. | 298/11 X |
| 3,804,278 | 4/1974 | James, III | 414/489 |
| 3,998,491 | 12/1976 | Diem | 298/11 |
| 4,081,074 | 3/1978 | Stone | 414/523 X |
| 4,256,431 | 3/1981 | Strauss et al. | 414/505 |
| 4,478,548 | 10/1984 | Heimes | 414/502 |
| 4,790,715 | 12/1988 | Alexander | 414/489 |

FOREIGN PATENT DOCUMENTS

| | | |
|---|---|---|
| 53739/73 | 2/1972 | Australia . |
| 488674 | 4/1976 | Australia . |
| 522770 | 6/1982 | Australia . |
| 525839 | 12/1982 | Australia . |
| 531489 | 8/1983 | Australia . |
| 572684 | 5/1988 | Australia . |
| 575713 | 8/1988 | Australia . |
| 3432619 | 3/1986 | Fed. Rep. of Germany ........ 298/11 |
| 465421 | 12/1968 | Switzerland ........................ 414/486 |

Primary Examiner—David A. Bucci

[57] ABSTRACT

A crop transporter comprising a main frame, a bin support frame attached to the main frame and a bin connected to the bin support frame. An elevator has an entrance area located in the forward portion of the bin with the elevator extending forwardly and upwardly from the entrance area to a discharge area. A cross conveyor is located substantially normal to the elevator and below and adjacent to the discharge area of the elevator. The cross conveyor is connected to the bin support frame and is movable therewith.

12 Claims, 6 Drawing Sheets

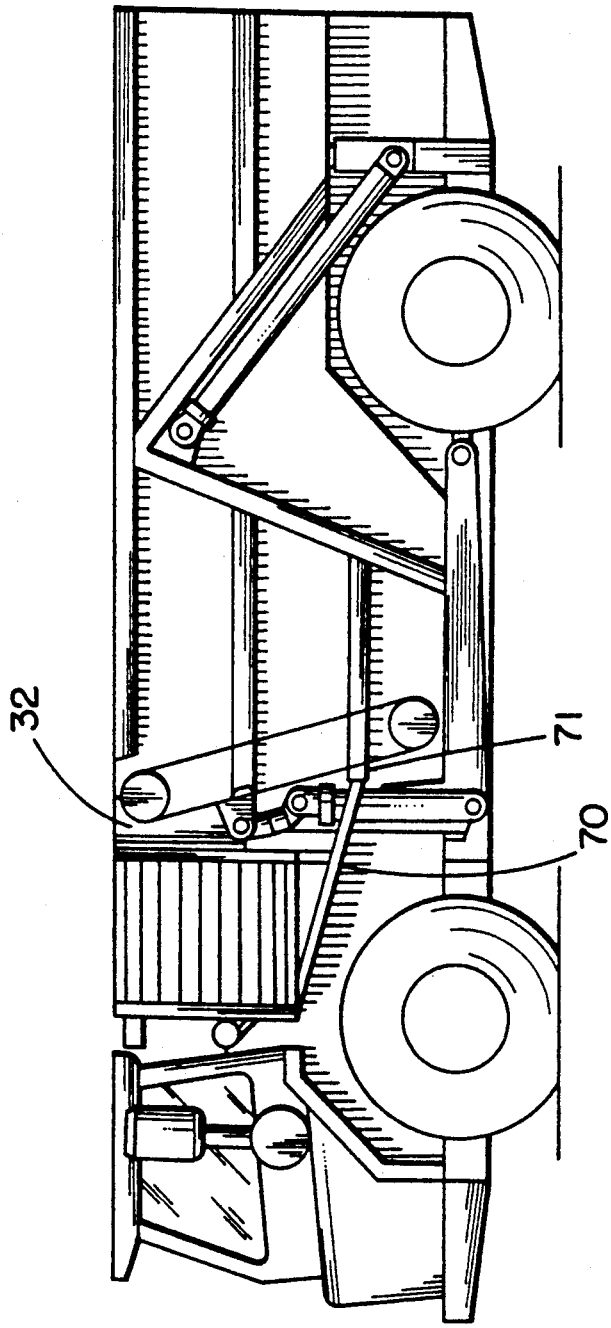

CROP TRANSPORTER

This is a continuation of co-pending application Ser. No. 07/431,711 filed Nov. 2, 1989 now abandoned, which is a continuation of application Ser. No. 07/209,535 filed June 21, 1988, now abandoned.

INTRODUCTION

This invention relates to a crop transporter and, more particularly, to a crop transporter for transporting and unloading sugarcane.

BACKGROUND OF THE INVENTION

Present transporters, while providing successful assistance in the loading, transporting and unloading of cane billets, also contain shortcomings which decrease their flexibility and increase costs.

For example, articulated vehicles are presently used in one crop transporter design. While such articulated vehicles need not use steerable front axles which, when mechanically driven, can be complex and costly, articulated vehicles are inherently less stable than vehicles using a rigid frame. This instability is underlined when large tires are used as is the case with cane transporters because of the often wet and adverse field conditions under which cane harvesting frequently takes place.

A further transporter uses an elevator and a cross conveyor, the elevator raising the cane billets from the bin in which the billets are transported and the cross conveyor receiving the billets from the elevator and conveying them normal to the longitudinal axis of the transporter to a loading bin located at the side of the transporter. While these transporters serve to suitably unload the billets when the loading bin is located at the appropriate height, it frequently is the case that the top of the loading bin is higher than the discharge exit of the cross conveyor. The only way to raise the cross conveyor for suitable discharge is to raise the entire vehicle and this is time consuming and unacceptable.

Yet a further problem with present transporters relates to the shape of the bin in which the cane billets are transported. Since the support structure for the bin is located at the forward portion of the bin and since the width restrictions for trucks and other vehicles used on public roads prohibit excess width, the forward portion of the bin is tapered as it leads to the elevator. The tapered portion is vulnerable to being clogged or jammed because it is especially difficult to compress cane and also because cane harvesting, particularly green cane harvesting, inherently includes a large amount of trash which may contribute to the build up in the tapered area.

SUMMARY OF THE INVENTION

According to one aspect of the invention, there is disclosed a crop transporter comprising a main frame, a bin support frame attached to said main frame, a bin attached to bin support frame, an elevator with an entrance area located in the forward portion of said bin, said elevator extending forwardly and upwardly from said entrance area to a discharge area, a cross conveyor located substantially normal to said elevator and being below and adjacent to said discharge area of said elevator, said cross conveyor being connected to one of said bin or bin support frame and being movable therewith.

According to a further aspect of the invention, there is disclosed a crop transporter comprising a main frame, a bin support frame connected to said main frame, a bin having two oppositely facing sidewalls, an endwall and a frontwall, said bin being pivotably connected to said bin support frame at a position forwardly of said frontwall and first elevating means connected between said main frame and said bin support frame.

BRIEF DESCRIPTION OF THE SEVERAL VIEWS OF THE DRAWINGS

A specific embodiment of the invention will now be described, by way of example only, with the use of drawings in which;

FIG. 4 is a side view of the crop transporter;

DESCRIPTION OF SPECIFIC EMBODIMENT

Figure 1:
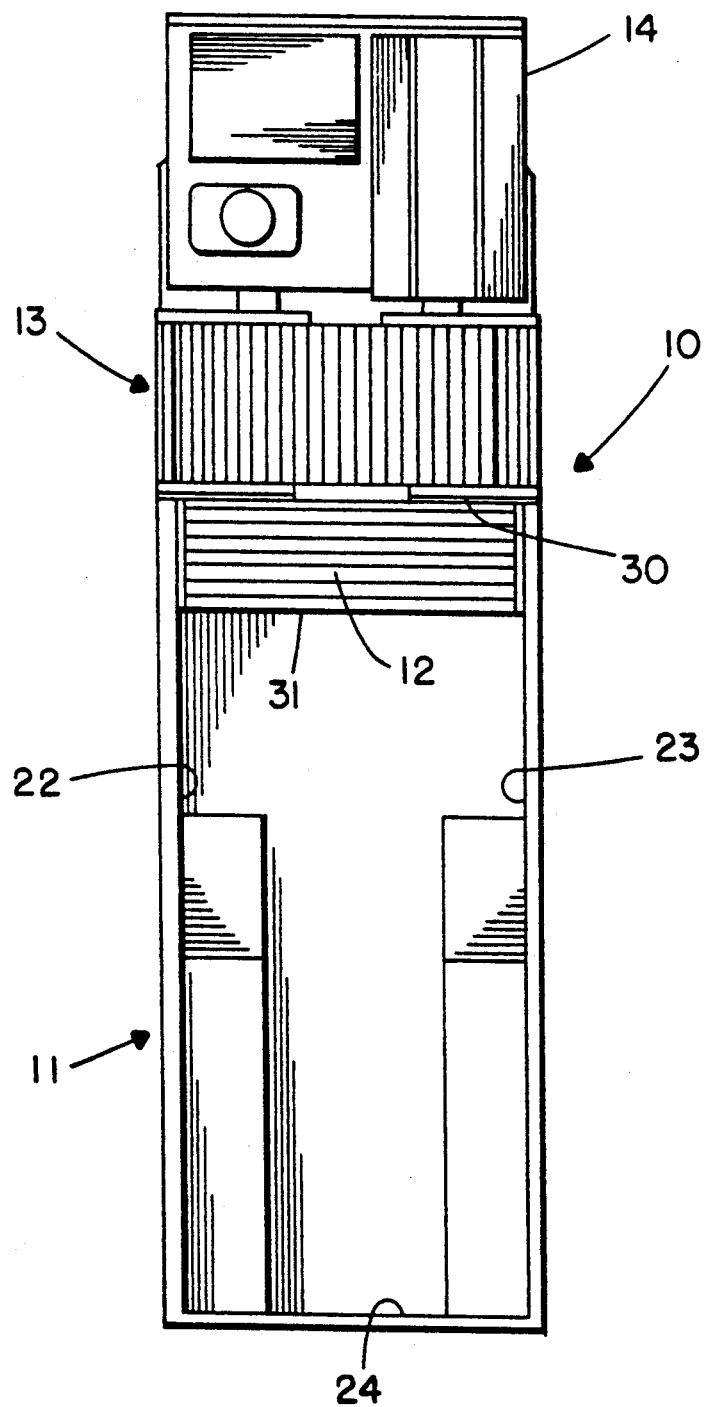
FIG. 1 is a plan view of the crop transporter according to the invention.

Referring now to the drawings, a crop transporter is shown generally at 10 in the figures. It comprises a bin generally shown at 11, an elevator 12 within the bin 11 (FIG. 1), a cross conveyor shown generally at 13 and the operators console or cab 14 at the forward end and righthand side of the transporter 10.

The transporter 10 has a rigid frame or chassis 20 running the length of the transporter 10. The operators console 14 is mounted directly to the chassis 20 as well as the prime mover or engine 21.

The bin 11 has two oppositely facing sidewalls 22,23, an endwall 24 and a frontwall 30. The elevator 12 has an entrance area 31 within the forward portion of the bin 11 and a discharge area 32 (FIG. 4) located forwardly and upwardly from the entrance area 31.

The cross conveyor 13 is located substantially normal to the elevator 12 and is located below and adjacent to the discharge area 32 of the elevator 12. Two extendible wings 33,34 are provided, one on each end of the main or central portion 40 of the cross conveyor 13. The wings 33,34 are pivotably connected to the central portion 40 of the cross conveyor 13 and a pair of hydraulic cylinders 41, 42 are connected between the central portion 40 of the cross conveyor 13 and the wings 33,34 as clearly shown in FIG. 3.

A bin support frame 43 is connected by way of a pivotable connection 44 at each side of the chassis 20 to the chassis 20. A pair of elevating hydraulic cylinders 50 (only one of which is shown) are mounted between the chassis 20 and the bin support frame 43. The cylinders 50 (only one of which is shown) act to raise the bin support frame 43 relative to the chassis 20.

Figure 5A:
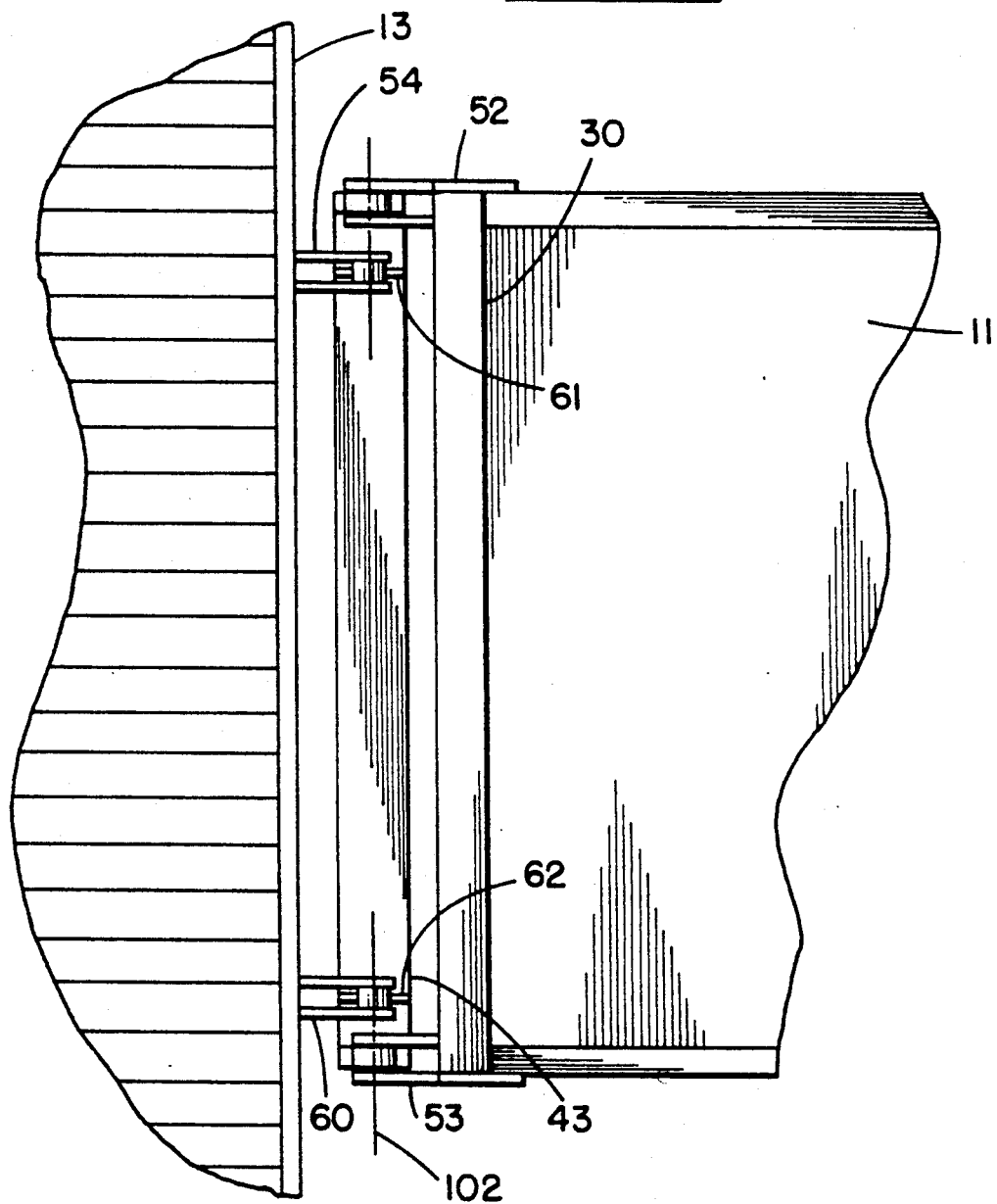
FIGS. 5A and 5B illustrate an enlarged partial plan and a partial side view of the attachment details between the cross conveyor, the bin support frame and the bin.
Figure 5B:
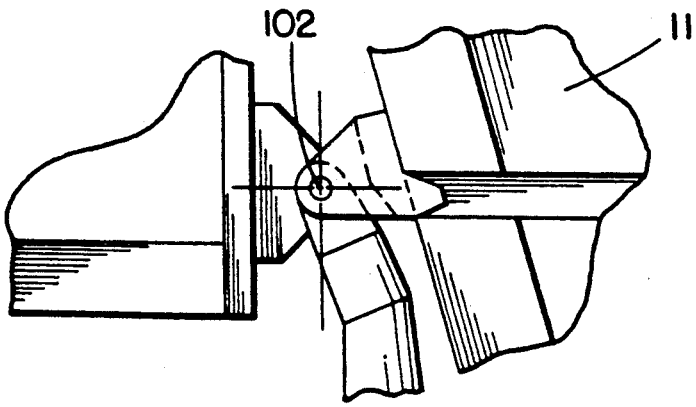
Figure 6A:
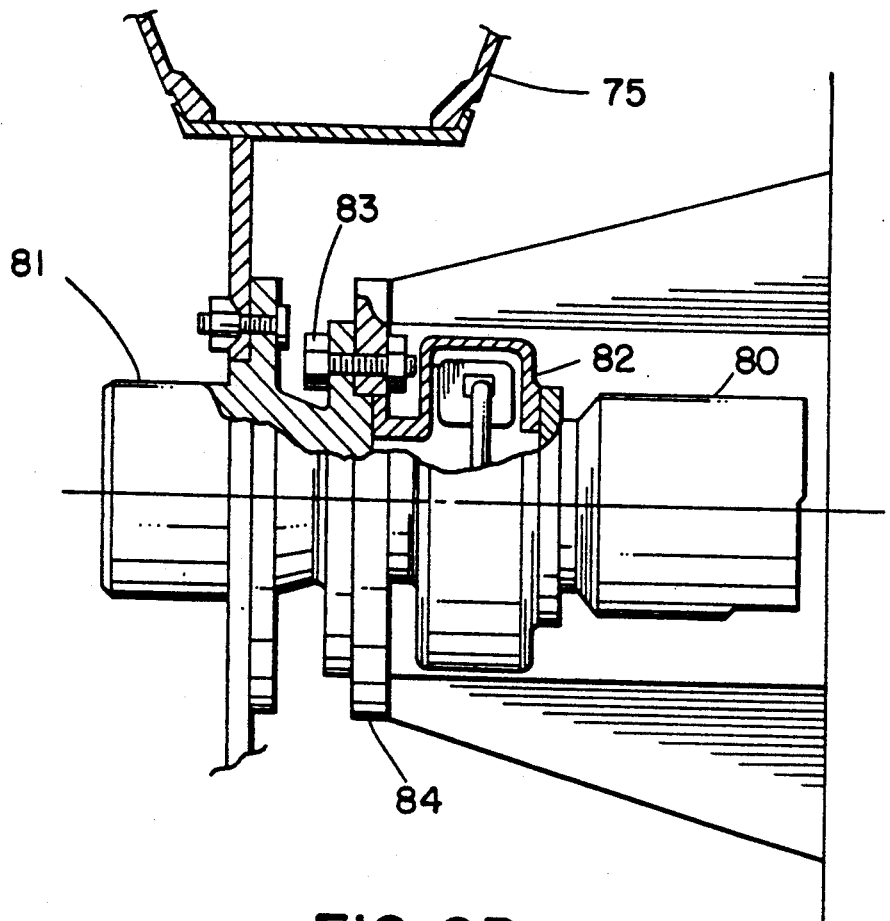
FIGS. 6A and 6B illustrate the rear wheel assembly and the front axle assembly, respectively.
Figure 6B:
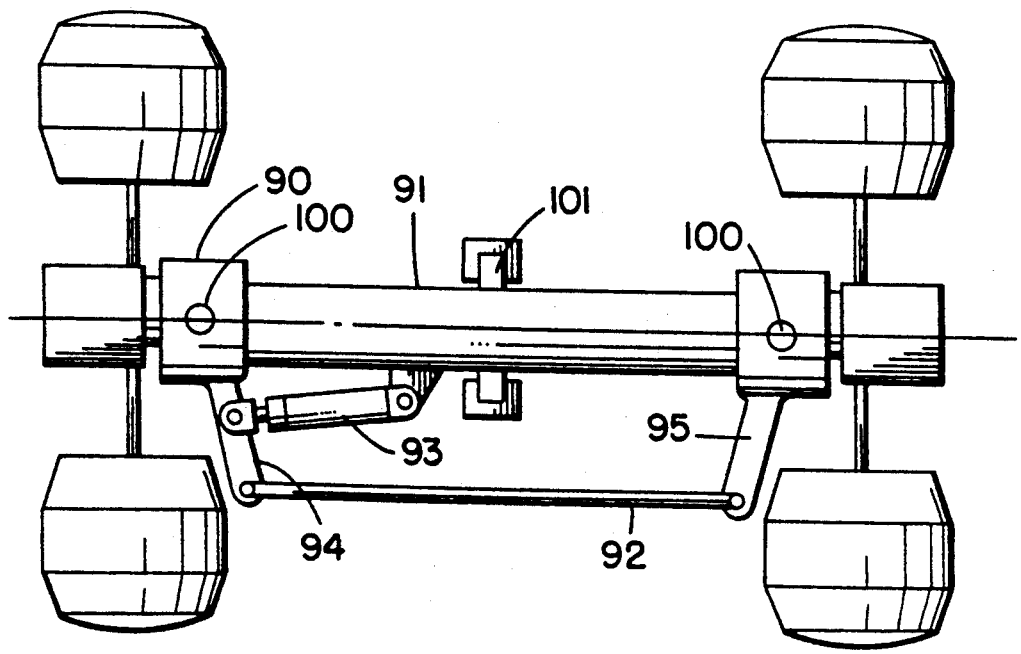

A pair of twin brackets 52,53 extend forwardly from the forward edge of the frontwall 30 of the bin 11 as clearly illustrated in FIGS. 5A and 5B. The bin 11 is pivotably connected to the bin support frame 43 by way of pivotable connections at the twin brackets 52,53. The cross conveyor 13 includes a pair of brackets 54,60 and these brackets 54,60 are pivotably connected to respective arms 61,62 extending from the bin support frame 43. A pair of elevating hydraulic cylinders 63 (only one of which is shown) are connected between the frame 20 and the bin 11 as clearly seen in FIG. 3. These cylinders 63 raise the bin 11 relative to the main frame 20 and tilt the bin 11 relative to the bin support frame 43.

Figure 3:
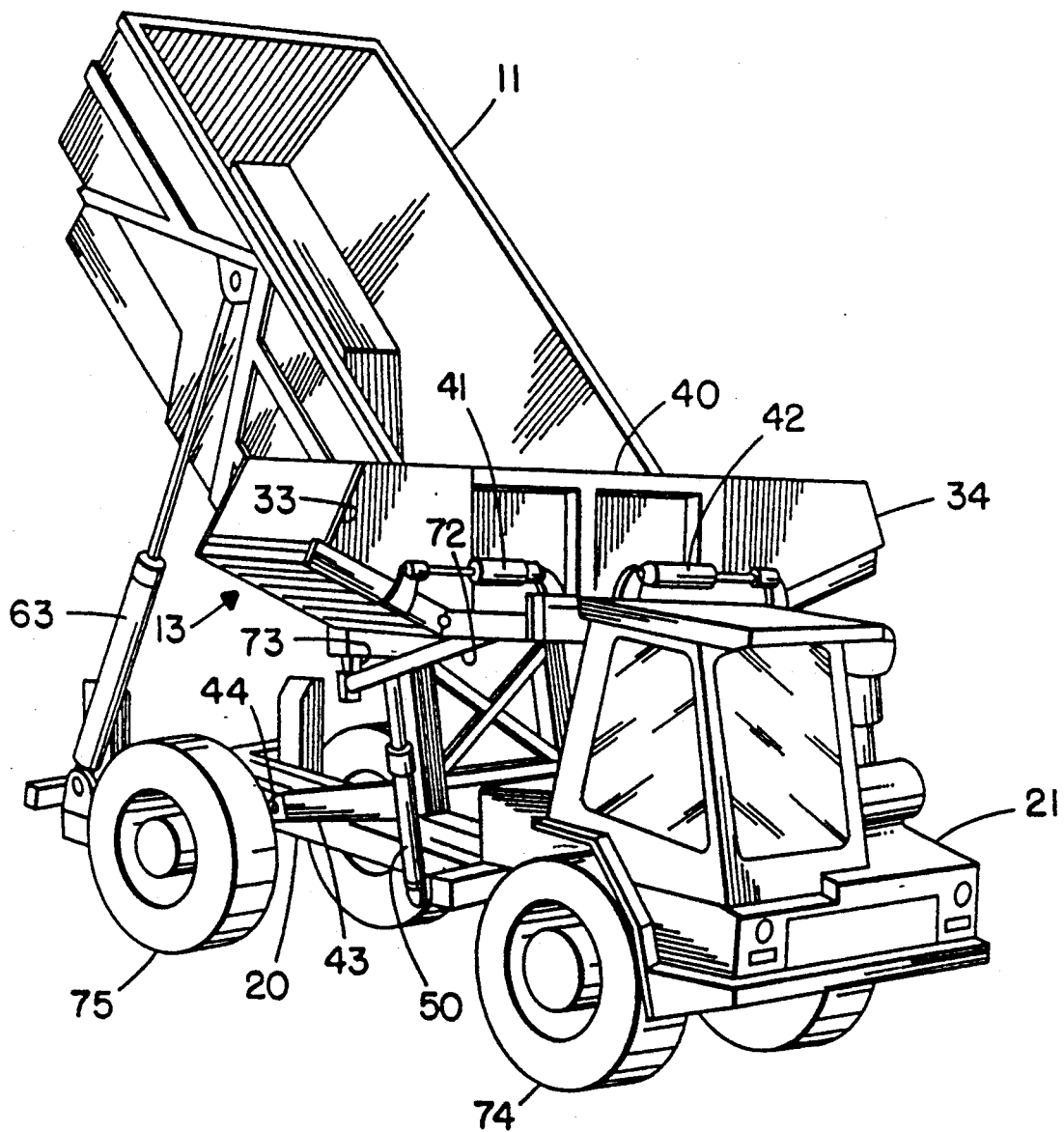
FIG. 3 is an isometric view of the crop transporter similar to FIG. 2 but with the bin and cross conveyor illustrated in a position for unloading the bin.

Since the cross conveyor 13 is pivotably connected to the bin support frame 43 and, accordingly, will be raised or lowered depending on the movement of the bin support frame 43, the cross conveyor 13 must be maintained substantially horizontally throughout its travels in the vertical direction with bin support frame 43. To this end, two separate support mechanisms are provided to serve this function. When the bin 11 is in the loading position as most clearly seen in FIG. 4, a support arm 70 extends from the bottom of cross conveyor 13 to a stop 71 on the forward end of the frontwall 30 of bin 11. When the cross conveyor 13 is in its raised position as illustrated in FIG. 3 and the bin 11 is tilted to its unloading position, a second support arm 72 is used which abuts a stop 73 on the bin support frame 43.

The wheels 74, 75 of the transporter 10 are individually powered by a respective hydraulic motor 80. The rear wheels 75 are connected to reduction hubs 81 which have a reduction ratio of approximately 30:1. The reduction hubs 81 are connected to a respective disc brake 82 and thence to the respective hydraulic motor 80. The reduction hub-disc brake assembly is connected to a mounting plate 84 by bolts 83 and the mounting plate is connected directly to the chassis 20.

The forward wheels 74 are similarly each connected to a reduction hub 81 with its disc brake 82 and hydraulic motor 80. This assembly, however, is connected to a mounting plate 90 which is pivotably connected at 100 to a rocking axle 91 which is pivotably connected by pin 101 to the chassis 20.

A tie rod 92 extends between the two steering links 94, 95 and a steering cylinder 93 is mounted to the rocking axle 91 and extends to a steering link 94 connected between the mounting plate 90 and the tie rod 92.

OPERATION

Figure 2:
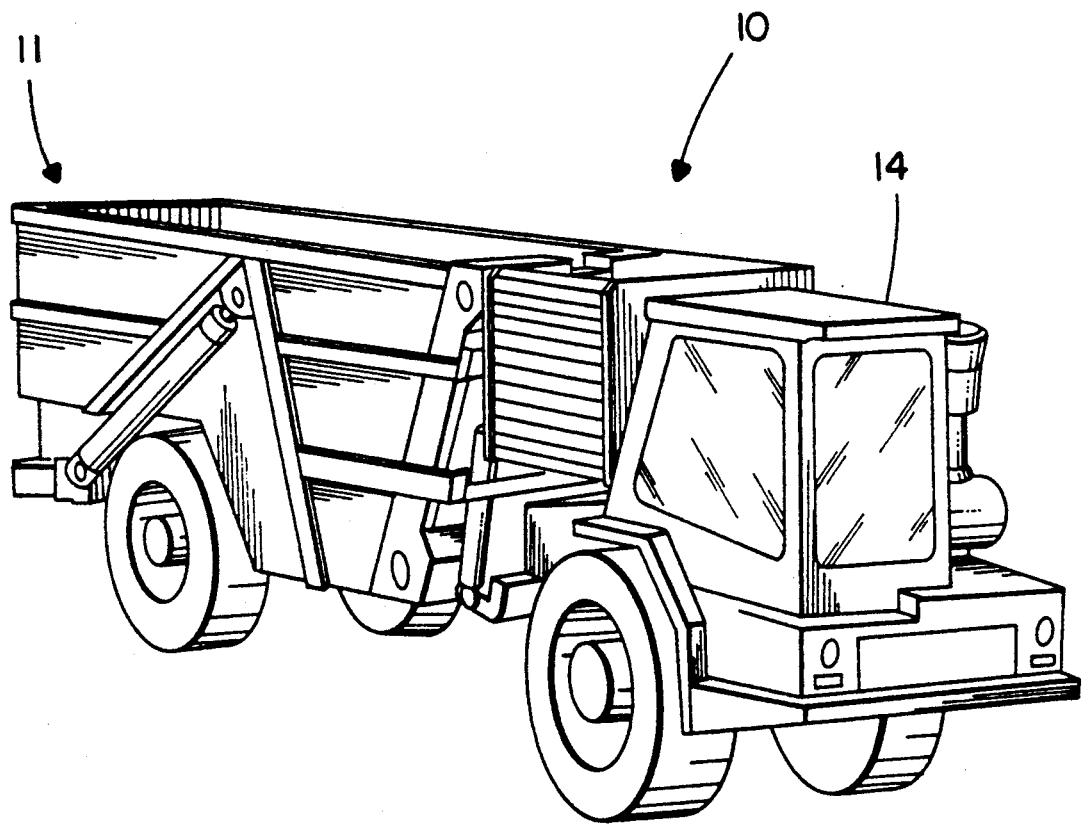
FIG. 2 is an isometric view of the crop transporter according to the invention with the bin and cross conveyor in the loading position.

In operation, the transporter 10 will proceed in the condition illustrated in FIGS. 1, 2 and 4 and will be positioned beside a harvester (not shown) as the harvester proceeds through the cane field. Because the frame 20 of the transporter 10 is rigid, the operator has the increased flexibility of backing the transporter 10 if desired. The position of the operators console 14 on the side of the transporter 10 further facilitates the operation by giving the operator a clear view of any obstructions on the headlands and for street operation.

When the loading is complete or when the operator desires, the transporter 10 then proceeds with its load of billets to the unloading station. The hydraulic cylinders 50 are then extended by the operator which will act to raise the bin support frame 43 and, consequently, the cross conveyor 13 and bin 11 until the desired unloading height for the cross conveyor 13 is reached. As the bin support frame 43 is being raised, the support arm 70 will be in contact with stop 71 on bin 11 and, therefore, the cross conveyor 13 will remain substantially horizontal. The operator will extend the hydraulic cylinders 41,42 to fully extend the wings 33,34 of the cross conveyor 13.

The operator will then initiate operation of the tilt motion of the bin 11 by extending the hydraulic cylinders 63. The bin 11, being pivotably connected to the bin support frame 43, will rotate upwardly about horizontal axes 102 (FIGS. 5A and B) until the bin 11 reaches the position shown in FIG. 3. As the bin 11 moves upwardly, the cross conveyor 13 would normally move downwardly about axis 102 because of the movement of stop 71 on bin 11 with its associated support arm 70. To prevent such movement, the further support arm 72 is provided which contacts stop 73 on bin support frame 43 after the cross conveyor 13 moves downwardly a predetermined distance. Thus, the cross conveyor 13 continues to maintain a substantially horizontal unloading position regardless of the respective positions of the bin 11 and the bin support frame 43.

The billets carried by the bin 11 will move to the forward portion of the bin 11 and will be carried by the elevator 12 from its entrance area 31 to its discharge area 32 (FIG. 4). The crop falls downwardly onto the central portion 40 of cross conveyor 13. Depending on the side chosen for unloading the transporter 10, the cross conveyor 13 will be run right or left so as to carry the billets from the central portion 40 and discharge them into an adjacent receiving bin located beside the transporter 10.

Following the completion of the unloading operation, the bin 11 is moved downwardly by retracting the hydraulic cylinders 63 and, following this operation, the hydraulic cylinders 41,42 are retracted which folds the wings 33,34 upwardly and vertical to the central portion 40 of the cross conveyor 13. The bin support frame 43 is then lowered by retracting hydraulic cylinders 50.

Many modifications may be made in the specific apparatus described which should be taken as illustrative of one embodiment of the invention only and not as limiting the scope of the invention which should be construed in accordance with the accompanying claims.

What is claimed is:

1. A crop transporter comprising:
   (a) a main frame,
   (b) a bin having a forward end and a rearward end,
   (c) an elevator with an entrance area located adjacent the forward end of the bin, said elevator extending forwardly and upwardly from the entrance area to a discharge area,
   (d) a cross conveyor located below and adjacent to the discharge area of the elevator, the cross conveyor being connected to the bin and being movable therewith,
   (e) first elevating means to raise and lower the forward end of the bin and the cross conveyor connected therewith, relative to the main frame, and
   (f) second elevating means to raise and lower the rearward end of the bin relative to the main frame and to pivot the bin about an axis normal to the direction of movement of the elevator and adjacent the discharge area of the elevator.

2. A crop transporter as claimed in claim 1 including a bin support frame having forward and rearward ends, the bin support frame being pivotably connected at or adjacent its rearward end to the main frame and being pivotably connected at or adjacent its forward end to the bin.

3. A crop transporter as claimed in claim 2 in which the first elevating means extends between the main frame and the forward end of the bin support frame.

4. A crop transporter as claimed in claim 2 including means for pivotably connecting the cross conveyor to the bin.

5. A crop transporter as claimed in claim 4 including means for maintaining the cross-conveyor in a substantially horizontal plane in both its raised and lowered positions.

6. A crop transporter as claimed in claim 1 in which the second elevating means extends between the main frame and the bin at a point distal to the forward end thereof.

7. A crop transporter as claimed in claim 2 in which the second elevating means extends between the main frame and the bin at a point distal to the forward end thereof.

8. A crop transporter as claimed in claim 3 in which the second elevating means extends between the main frame and the bin at a point distal to the forward end thereof.

9. A crop transporter as claimed in claim 1 in which the bin includes a pair of substantially parallel side walls and the elevator extends across the full width of the forward end of the bin between the side walls.

10. A crop transporter as claimed in claim 2 in which the bin includes a pair of substantially parallel side walls and the elevator extends across the full width of the forward end of the bin between the side walls.

11. A crop transporter as claimed in claim 3 in which the bin includes a pair of substantially parallel side walls and the elevator extends across the full width of the forward end of the bin between the side walls.

12. A crop transporter as claimed in claim 6 in which the bin includes a pair of substantially parallel side walls and the elevator extends across the full width of the forward end of the bin between the side walls.

* * * * *